United States Patent [19]

Strauss

[11] E Patent Number: Re. 33,253

[45] Reissued Date of Patent: Jul. 3, 1990

[54] COMPONENT MOUNTING MEANS FOR A TENSION MASK COLOR CATHODE RAY TUBE

[75] Inventor: Paul Strauss, Chicago, Ill.

[73] Assignee: Zenith Electronics Corporation, Glenview, Ill.

[21] Appl. No.: 341,507

[22] Filed: Apr. 21, 1989

Related U.S. Patent Documents

Reissue of:

[64] Patent No.: 4,779,023
Issued: Oct. 18, 1988
Appl. No.: 60,142
Filed: Jun. 6, 1987

U.S. Applications:

[63] Continuation-in-part of Ser. No. 866,030, May 21, 1986, Pat. No. 4,737,681.

[51] Int. Cl.[5] ..... H01J 29/07; H01J 29/02

[52] U.S. Cl. ..... 313/402; 313/407; 313/479; 313/482

[58] Field of Search ..... 313/402, 407, 479, 482

[56] References Cited

U.S. PATENT DOCUMENTS

| | | | |
|---|---|---|---|
| 2,625,734 | 1/1953 | Law | 29/25.13 |
| 2,842,696 | 7/1958 | Fisher-Colbrie | 313/78 |
| 2,905,845 | 9/1953 | Vincent | 313/78 |
| 3,030,536 | 4/1962 | Hackett et al. | 313/80 |
| 3,284,655 | 11/1966 | Oess | 313/286 |
| 3,541,373 | 11/1970 | Barr | 313/407 |
| 3,638,063 | 1/1972 | Tachikawa et al. | 313/348 |
| 3,727,087 | 4/1973 | Steinberg et al. | 313/91 |
| 3,844,321 | 7/1975 | Moore | 313/402 X |
| 4,045,701 | 8/1977 | Dougherty | 313/482 X |
| 4,119,885 | 10/1978 | Stover | 313/479 |
| 4,547,696 | 10/1985 | Strauss | 313/407 |
| 4,571,521 | 2/1986 | Gallaro et al. | 313/402 |
| 4,710,670 | 12/1987 | Dougherty et al. | 313/402 |

FOREIGN PATENT DOCUMENTS 56-141148 4/1981 Japan .

OTHER PUBLICATIONS

N.F. Fyler, "The CBS-Colortron: A Color Picture Tube of Advanced Design", Jan. 1954, pp. 326-334.

Robinder et al., "A High-Brightness Shadow-Mask Color CRT for Cockpit Displays", Tektronix, Inc., 12/83, pp. 72-73.

*Primary Examiner*—Donald J. Yusko
*Assistant Examiner*—Michael Horabik

[57] ABSTRACT

A front assembly for a color cathode ray tube is disclosed that as having improved means for mounting components for electrical interconnection and magnetic shielding. The assembly comprises a faceplate having on its inner surface a centrally disposed, electrically conductive phosphor screen. A peripheral sealing area is located on the inner surface of the faceplate for receiving a funnel, and the funnel has an internal electrically conductive funnel coating adapted to receive a high electrical potential. A metallic shadow mask support structure is secured to the inner surface of the faceplate between the screen and the peripheral sealing area, and encloses the screen and is in contact with the screen. The structure supports in electrical union therewith a tensed foil shadow mask. The structure has a side adjacent to the sealing area essentially perpendicular to the screen which has secured thereto by weldments an internal magnetic shield. The assembly includes an electrical conductor located in an opening in the shield and in contact with the internal conductive coating of the funnel, whereby a high voltage connection is formed between the funnel coating, the screen and the mask.

8 Claims, 4 Drawing Sheets

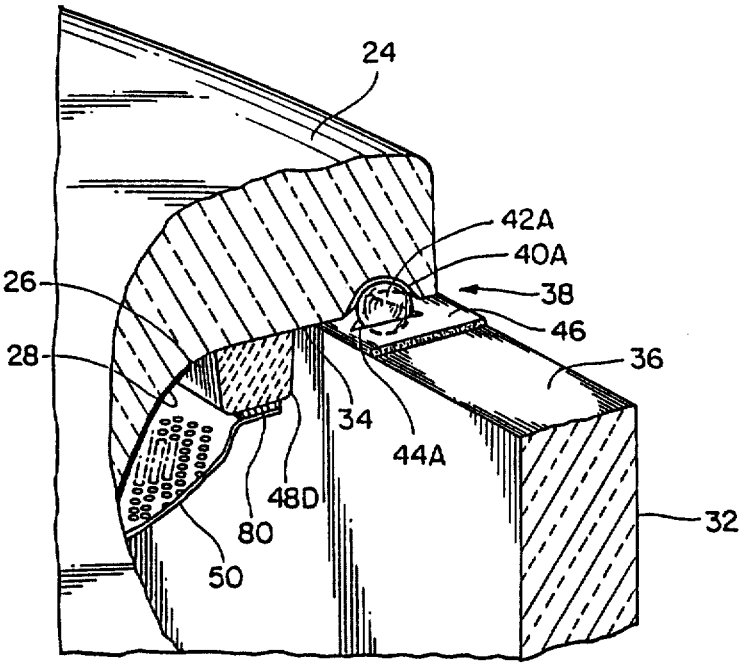
Fig. 3
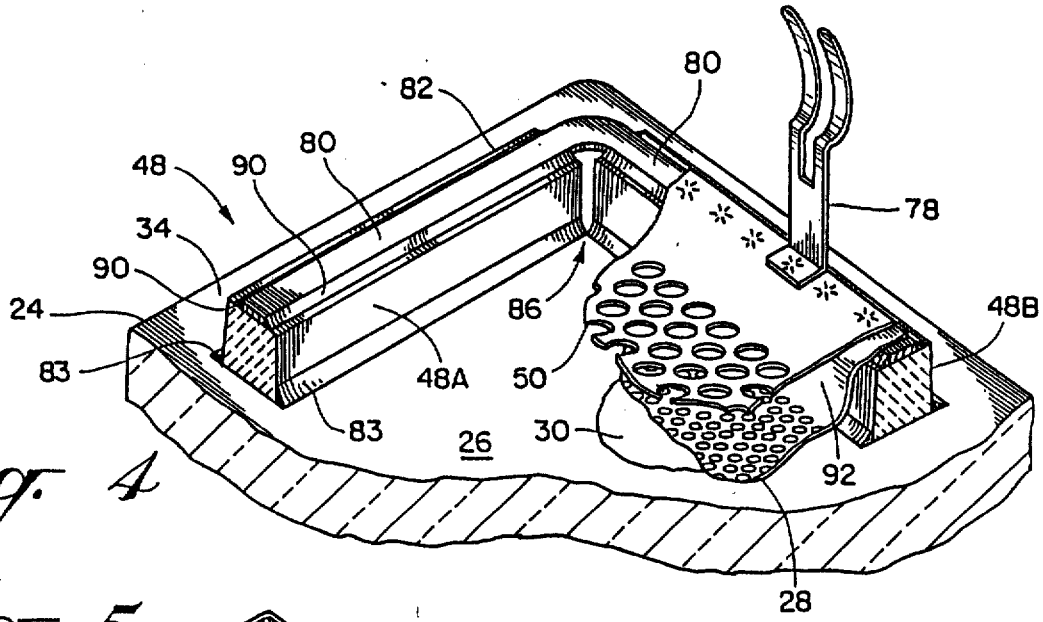
Fig. 4
Fig. 5
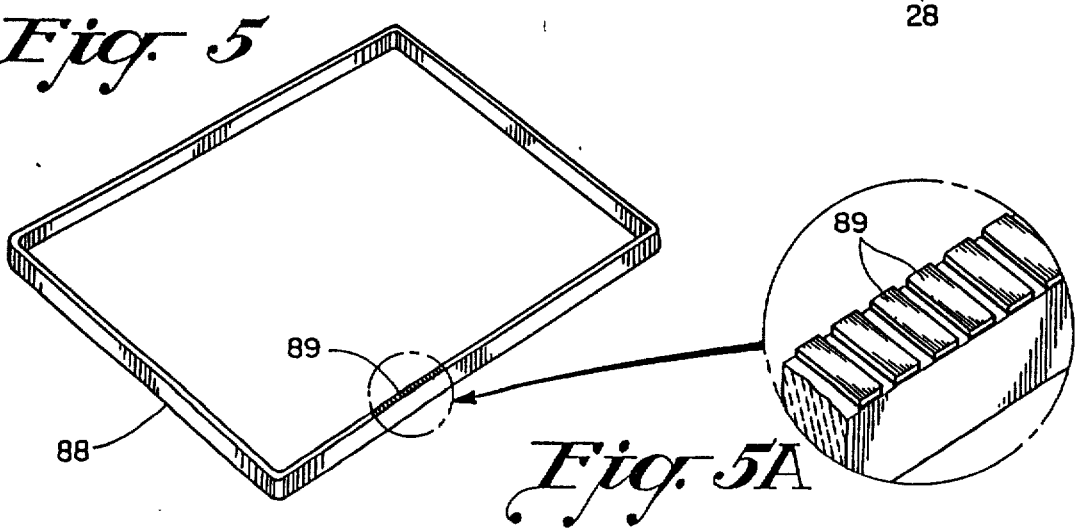
Fig. 5A

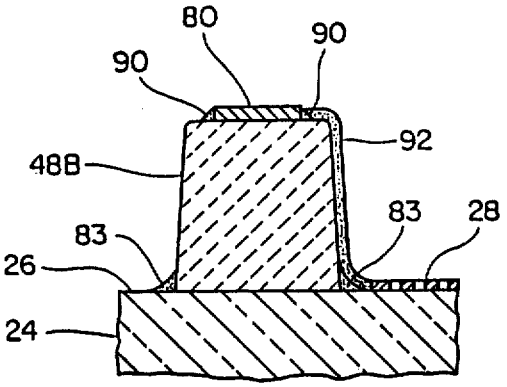
Fig. 6
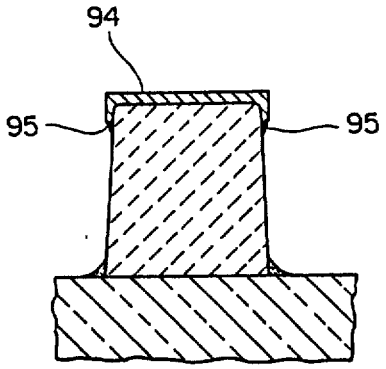
Fig. 7
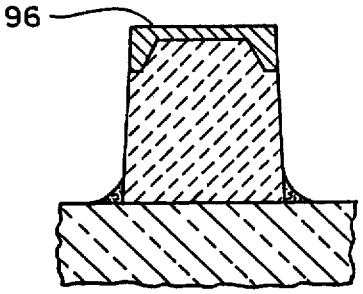
Fig. 8
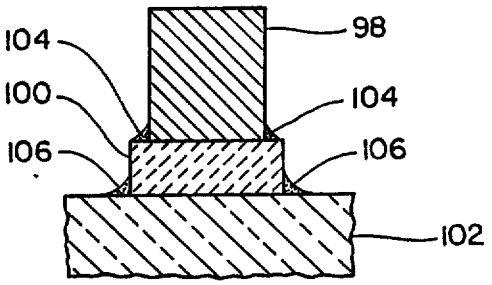
Fig. 9
Fig. 10
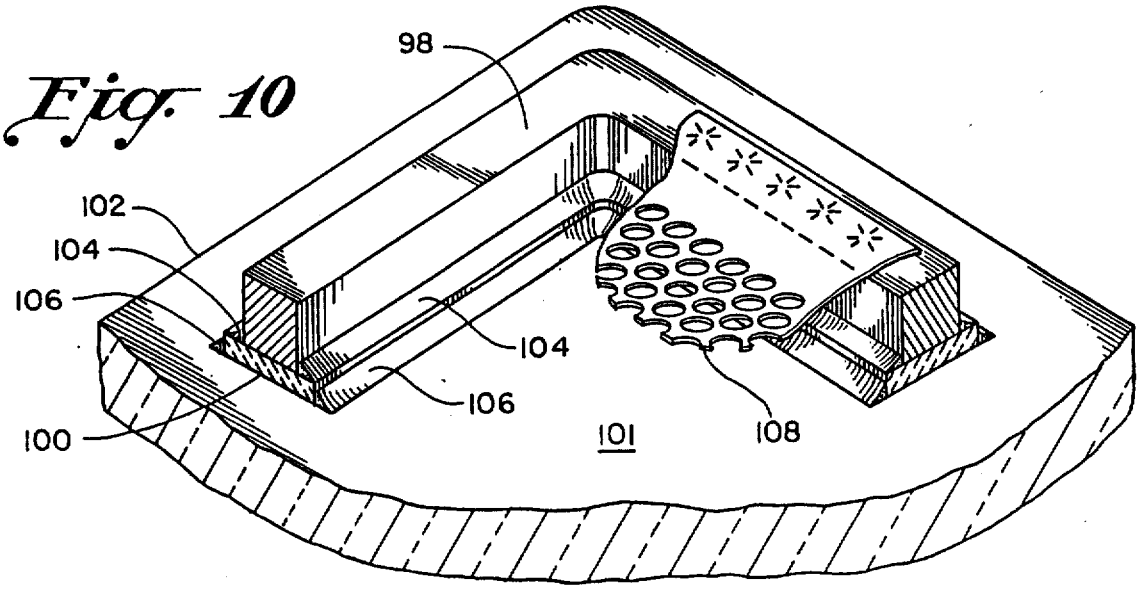

COMPONENT MOUNTING MEANS FOR A TENSION MASK COLOR CATHODE RAY TUBE

Matter enclosed in heavy brackets [ ] appears in the original patent but forms no part of this reissue specification; matter printed in italics indicates the additions made by reissue.

CROSS-REFERENCE TO RELATED APPLICATIONS AND PATENT

This application is a continuation-in-part of application Ser. No. 866,030 filed May 21, 1986, U.S. Pat. No. 4,737,681, in the names of Lenoard Dietch, James R. Fendley, John Jarosz and Paul Strauss.

This application is related to, but is no way dependent upon, applications Ser. No. 727,486 filed Apr. 26, 1985 U.S. Pat. No. 4,695,523; Ser. No. 832,493 filed Feb. 21, 1986 U.S. Pat. No. 4,730,143; Ser. No. 832,556 filed Feb. 21, 1986 U.S. Pat. No. 4,695,761; Ser. No. 831,696 filed Feb. 21, 1986 U.S. Pat. No. 4,721,488; Ser. No. 831,699 filed Feb. 21, 1986 U.S. Pat. No. 4,686,416; Ser. No. 835,845 filed Mar. 3, 1986 U.S. Pat. No. 4,725,756; Ser. No. 006,391 filed Jan. 23, 1987 U.S. Pat. No. 4,745,336; and U.S. Pat. No. 4,547,696, all of common ownership herewith.

BACKGROUND OF THE INVENTION

1. Field of the Invention

This invention relates to color cathode ray picture tubes, and is addressed specifically to an improved front assembly for color tubes having shadow masks of the tensioned foil type in association with a substantially flat faceplate. The invention is useful in color tubes of various types, including those used in home entertainment television receivers, and in medium-resolution and high-resolution tubes intended for color monitors.

The use of the tensioned foil mask and flat faceplate provides many benefits in comparison to the conventional domed shadow mask and correlatively curved faceplate. Chief among these is a greater power-handling capability which makes possible as much as a three-fold increase in brightness. The conventional curved shadow mask, which is not under tension, tends to "dome" in picture areas of high-brightness where the intensity of the electron beam bombardment is greatest. Color impurities result as the mask moves closer to the faceplate. As it is under high tension, the tensioned foil mask will dome, but negligibly in comparison with the curved mask. Its relative immunity to doming provides for greater brightness potential while maintaining color purity.

The tensioned foil shadow mask is a part of the cathode ray tube front assembly, and is located in close adjacency to the faceplate. The front assembly comprises the faceplate with its screen consisting of deposits of light-emitting phosphors, a shadow mask, and support means for the mask. As used herein, the term "shadow mask" means an apertured metallic foil which may, by way of example, be about one mil thick, or less. The mask must be supported in high tension a predetermined distance from the inner surface of the cathode ray tube faceplate; this distance is known as the "Q-distance." As is well known in the art, the shadow mask acts as a color-selection electrode, or parallax barrier, which ensures that each of the three beams lands only on its assigned phosphor deposits.

The requirements for a support means for tensioned foil shadow masks are stringent. As has been noted, the foil shadow mask is normally mounted under high tension. The support means should be of high strength so the mask is held immovable; an inward movement of the mask of as little as one-tenth of a mil is significant in expending guard band. Also, it is desirable that the shadow mask support means be of such configuration and material composition as to be compatible with the means to which it is attached. As an example, if the support means is attached to glass, such as the glass of the inner surface of the faceplate, the support means should have substantially the same thermal coefficient of expansion as the glass, and by its composition, be bondable to glass. Also, the support means should be of such composition and structure that the mask can be secured to it by production-worthy techniques such as electrical resistance welding or laser welding. Further, it is essential that the support means provide a suitable surface for mounting and securing the mask. The material of which it is composed should be adaptable to machining or other forms of shaping so that it can be contoured into near-perfect flatness so that no voids between the metal of the mask and the support structure can exist to prevent the positive, all-over contact required for proper mask securement.

A tensioned mask registration and supporting system is disclosed by Strauss in U.S. Pat. No. 4,547,696 of common ownership herewith. A frame dimensioned to enclose the screen comprises first and second space-apart surfaces. A tensed foil shadow mask has a peripheral portion bonded to a second surface of the frame. The frame is registered with the faceplate by ball-and-groove indexing means. The shadow mask is sandwiched between the frame and a stabilizing or stiffening member. When the system is assembled, the frame is located between the sealing lands of the faceplate and a funnel, with the stiffening member projecting from the frame into the funnel. While the system is feasible and provides an effective means for holding a mask under high tension and rigidly planoparallel with the flat faceplate, weight is added to the cathode ray tube, and additional process steps are required in manufacture.

There exists in the marketplace today a color tube which utilizes a tensed shadow mask. The mask is understood to be placed under high tension by purely mechanical means. Specifically, a very heavy mask support frame is compressed prior to and during affixation of the mask to it. Upon release of the frame, restorative forces in the frame cause the mask to be placed under high residual tension. During normal tube operation, electron beam bombardment causes the mask to heat up and the mask tension to be reduced. An upper limit is therefore placed on the intensity of the electron beams used to bombard the screen; this limitation prevents the mask from relaxing completely and thus losing its color selection capability. For a description of this type of tube, see U.S. Pat. No. 3,638,063 to Tachikawa et al.

An avionics color cathode ray tube having ceramic components is described in a journal article by Robinder et al of Tektronix, Inc. A shadow mask is mounted in a ceramic ring/faceplate assembly, with the mask suspended by four springs oriented in the z-axis. Ceramic is also used to form a two-piece x-ray-attenuating body. A flat, high-voltage faceplate is utilized, together with a glass neck flare. (From "A High-Brightness Shadow-Mask Color CRT for Cockpit Displays,"

Robinder et al. Digest of a paper presented at the 1983 symposium of the Society for Information Display.)

A color picture tube having a conventional curved faceplate and correlatively curved, untensed shadow mask is disclosed in Japanese Pat. No. 56-141148 to Mitsuru Matshusita. The purpose according to a quotation from the abstract is " . . . To rationalize construction and assembly of a tube, by both constituting its envelope from a panel, ceramic shadow mask mounting frame and funnel and integrally forming a surplus electron beam shielding plate to the shadow mask mounting frame."

OTHER PRIOR ART

U.S. Pat. No. 2,625,734—Law
U.S. Pat. No. 2,842,696—Fischer-Colbrie
U.S. Pat. No. 2,905,845—Vincent
U.S. Pat. No. 3,284,655—Oess
U.S. Pat. No. 3,894,321—Moore
U.S. Pat. No. 3,727,087—Steinberg et al
U.S. Pat. No. 3,030,536—Hackett et al
U.S. Pat. No. 4,045,701—Dougherty Journal article: "The CBS Colortron: A Color Picture Tube of Advanced Design." Flyer et al. Proceedings of the Institute of Radio Engineers (IRE), Jan. 1954.

OBJECTS OF THE INVENTION

It is an object of the invention to provide improved means for mounting components in the front assembly of a color cathode ray tube having a tension foil shadow mask.

It is another object of the invention to provide improved means for mounting electrical interconnection means and internal magnetic shield means in the front assembly of a tension mask color cathode ray tube.

BRIEF DESCRIPTION OF THE DRAWINGS

FIG. 3 is a cutaway view in perspective of a section of the tube front assembly showing in greater detail the location and orientation of a part of the FIG. 1 embodiment of the shadow mask support structure following its installation in a cathode ray tube;

FIG. 4 is a perspective view of a corner section of the embodiment of the shadow mask support structure depicted in FIGS. 1–3, with a section of a shadow mask secured thereto;

FIG. 5 is a perspective view of a unitary shadow mask support structure; 5A is an enlarged view of a section of FIG. 5 showing an additional detail of the shadow mask support structure shown by FIG. 5;

FIGS. 6–9 are sectioned views in elevation showing other configurative aspects of a shadow mask support structure according to the invention described and claimed in parent application Ser. No. 866,030.

FIG. 10 is a perspective view of a corner section of the embodiment of a shadow mask support shown by FIG. 9.

DESCRIPTION OF THE PREFERRED EMBODIMENT

Figure 1:
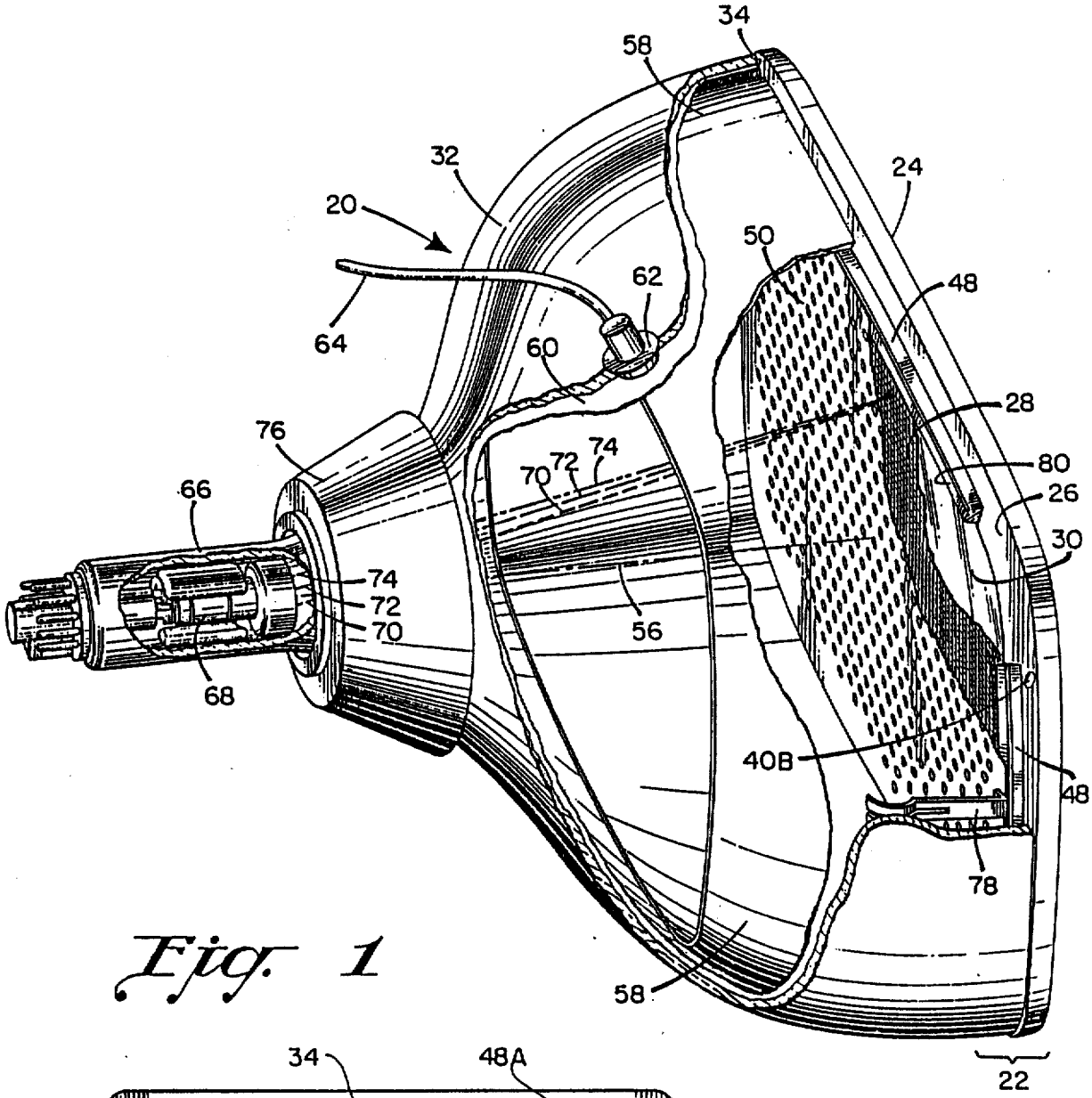
FIG. 1 is a side view in perspective of a color cathode ray tube having an improved shadow mask support structure according to the invention, with cut-away sections that indicate the location and relation of the embodiment of the invention to other major tube components.

This specification includes a description of the the best mode presently contemplated for carrying out the invention, and appended claims.

The components of the invention and the related parts of the associated cathode ray tube are disclosed in the drawings, which are not necessarily to scale, and are identified and described in the following paragraphs in this sequence; reference number, a reference name, and a brief description of structure, interconnections, relationship, functions, operation, and/or result, as appropriate.

Figure 2:
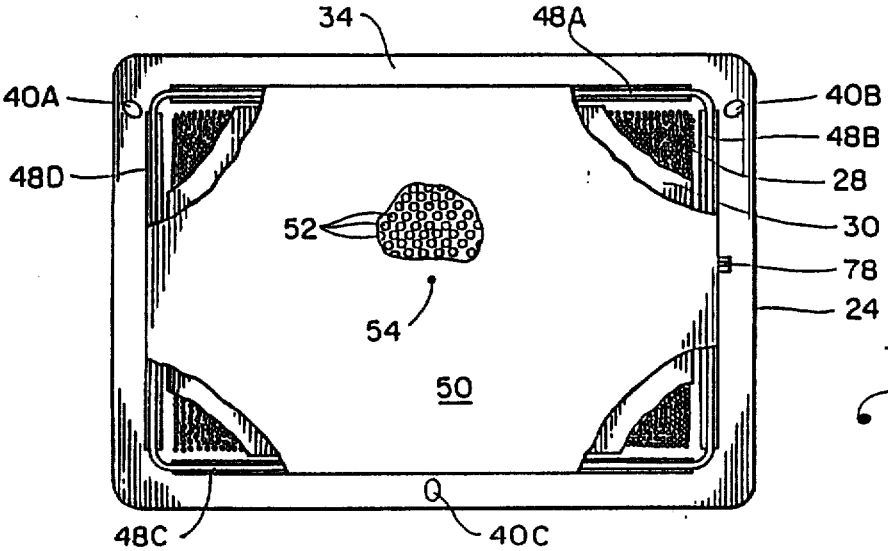
FIG. 2 is a plan view of the front assembly of the tube shown by FIG. 1, with parts cut away to show the relationship of the embodiment of the mask support structure shown by FIG. 1 with the faceplate and the shadow mask; an inset depicts mask apertures greatly enlarged.

(With initial reference to FIGS. 1, 2 and 3)

- 20, color cathode ray tube
- 22, front assembly
- 24, faceplate
- 26, inner surface of faceplate
- 28, centrally disposed phosphor screen
- 30, film of reflective and electrically conductive aluminum
- 32, funnel
- 34, peripheral sealing area of faceplate which is adapted to mate with a funnel
- 36, funnel-to-faceplate sealing area
- 38, indexing means for registering faceplate and funnel, and having these components:
  - 40A, 40B, 40C, V-grooves
  - 42A, 42B, 42C, ball means
  - 44A, 44B, 44C, cavities
- 46, layer of frit
- 48, separate shadow mask support structure according to an embodiment of the invention
- 50, a metal foil shadow mask secured under high tension
- 52, shadow mask apertures
- 54, center of mask
- 56, anterior-posterior axis of tube
- 58, internal magnetic shield—"IMS"
- 60, internal conductive coating on funnel
- 62, anode button
- 64, high-voltage conductor
- 66, neck of tube
- 68, in-line electron gun providing three discrete in-line electron beams for exciting the triads of phosphors deposited on screen 28
- 70, 72, 74, electron beams for activating respective red-light-emitting, green-light emitting, and blue-light-emitting phosphor deposits on screen 28

76, yoke which provides for the traverse of beams 70, 72 and 74 across screen 28

78, contact spring which provides an electrical path between the funnel coating 60 and the mask support structure 48

DESCRIPTION OF THE INVENTION

With reference to FIG. 4, there is depicted in greater detail a separate shadow mask support structure 48 shown by FIGS. 1–3; the structure is preferably composed of a ceramic material. Support structure 48 is depicted as having a separate cap 80 thereon, indicated as comprising a discrete metal strip, for securing shadow mask 50. Cap 80 preferably comprises a weldable material for securing shadow mask 50 by weldments, as indicated by the weldment symbols. The metal strip may be fastened to the surface 82 of the ceramic material by means of a suitable cement, the nature of which will be described infra.

The cap 80 may as well comprise a deposit of weldable metal which may, for example, be applied by electrolytically plating the metal onto the ceramic material, or, applying the metal to the ceramic material by technologies such as flame spraying or plasma arc spraying. Fritted pastes and resinates can also be used as welding bases; it is essential however that the weldable surface, whatever its composition, be thick enough to accept welding without loss of weld integrity. The shadow mask support structure 48 is indicated in FIG. 2 as comprising four discrete rails 48A–D; two of the rails, rails 48A and 48B, are depicted in a corner view FIG. 4. The rails will be seen as being secured to the inner surface 26 of faceplate 24 on opposed sides of the screen 28, between sealing area 34 and screen 28 for receiving and supporting a foil shadow mask 50 in tension a predetermined distance from the screen. The assembly includes means for interconnecting rails 48A–D to form a generally rectangular unitary shadow mask support structure (the four-rail structure is shown by FIG. 2). The preferred means for interconnecting the four rails comprises a continuous or discontinuous weldable metal strip secured to the top of each of the rails for securing the shadow mask 50 by weldments, as indicated by the weldment symbols. The metal strip may be fastened to the surface 82 of the ceramic material by means of a suitable cement, the nature of which will be described in a following paragraph. With reference to FIG. 4, a metal strip 80 is shown as interconnecting two of the rails, rail 48A and rail 48B, at the intersection 86 of the rails.

With reference to FIG. 5, an embodiment of a shadow mask support structure is shown wherein the structure is indicated as comprising a unitary frame 88 composed of a ceramic. As with the embodiment depicted in FIGS. 1–4, unitary frame 88 is secured to the inner surface of the faceplate and encloses the screen for receiving and supporting a foil shadow mask in tension a pre-determined distance from the screen. Unitary frame may also have a separate cap of weldable metal in the form of a continuous or discontinuous metal strip thereon similar to cap 80 shown by FIG. 4, for securing a shadow mask thereto by weldments. Cap 80 is shown as being continuous; a section of a discontinuous metal strip 89 is shown by FIG. 5A in which the discontinuous sections are depicted as being discrete islands of metal deposited on unitary frame 88. Also, the metal strip may be discontinuous in the sense that extensions of the strip may not be needed in corner areas as the tensing of the mask is accomplished primarily by pulling equally on all four sides rather than in the corners.

Other configurative aspects of the metal cap are shown by FIGS. 6–8. FIG. 6 depicts the metal cap 80 shown by FIG. 4 secured to the rail 48B, indicated graphically as being composed of a ceramic material. Cap 80 is represented as being secured to the rail by means of beads 90 of a cement. Rail 48B is also indicated as being secured to the inner surface 26 faceplate 24 by beads of cement 83. The support structures shown by FIGS. 7–10 are indicated graphically as being similarly secured to the associated faceplate by beads of cement. As the ceramic is a highly effective electrical insulator, an electrical path must be provided from the cap 80 to the screen 28. As shown by FIG. 4, and in greater detail in FIG. 6, the path is provided by coating the ceramic with an electrically conductive "dag" 92, shown as being in electrical contact with both the cap 80 and the screen 28. Although not shown in the respective figures, this deposition of dag is noted as being applied as well to all configurations of the shadow mask support means according to the invention.

As shown by FIG. 7, the metal rail may comprise a "crown" 94 that overlaps the sides of the mask support structure, and is secured by a cement 95. As depicted in FIG. 8, the crown 96 is preferably mortised into the mask support structure. This mortised-crown configuration is preferred as no voids or corners are left for the lodgement of contaminants such as remnants of screening fluids which could interfere with the operation of the finished tube. The crown can be secured to the mask support structure by a suitable cement.

With reference again to FIG. 1, the electrical path from the high voltage power supply to the screen 28 and its coating of aluminum 30 consists of, in sequence: the high-voltage conductor 64, the anode button 62 which is in contact with the internal conductive coating 60 on the funnel 32, and contact spring 78, which makes contact with the internal conductive coating 60. The electrical path from contact spring 78 to the shadow mask 50 is shown by FIG. 4, wherein contact spring 78 is shown as being welded onto the already secured shadow mask 50, as indicated by the respective weldment symbols. Electrical contact is also made with the underlying metal of cap 80 by way of the weldment. The electrical path from the shadow mask to the screen 28 is supplied by the coating of electrically conductive dag 92 depicted by FIGS. 4 and 6.

Another configurative aspect is shown by FIGS. 9 and 10 wherein a separate metal hoop 98 is depicted as being secured to a separate hoop support means 100, which is in turn secured to the inner surface 101 of a faceplate 102. As a result, the hoop 98 derives at least a substantial part of its rigidity from faceplate 102. The separate hoop support means 100 also called a "buffer strip," is preferably composed of a ceramic material. (In the context of this disclosure, "hoop" means a continuous band or loop of metal formed into a rectangle to conform to the aspect ratio of the tube faceplate.) The ceramic material is characterized by having a thermal coefficient of expansion substantially equal to the coefficient of the glass of the faceplate 102. The ceramic material could as well have a coefficient intermediate to the coefficients of the glass and the metal hoop effective to absorb the stresses produced due to the differing expansion and contraction coefficients of the glass and the metal hoop. The metal hoop 98 may be secured to the ceramic material, and the ceramic material to the faceplate, by a suitable cement, indicated by the fillets of cement 104 and 106, respectively. It is noted that in all cases, in addition to comprising the fillets of cement, the cement is also applied between the attached parts; e.g., between the hoop 98 and the ceramic material, and between the ceramic material and the glass of the faceplate, for additional securement.

By way of example, the thermal coefficients of the components described may comprise

| | parts per 10 million per degree Celsius |
|---|---|
| separate metal hoop 98 | 108 |
| separate ceramic hoop support means 100 | 105 |
| glass of faceplate 102 | 106 |

Note: Coefficients cited pertain to a temperature range of 25 degrees centigrade (ambient) to 430 degrees centigrade (the temperature at which glass frit devitrifies in the fritting cycle).

The metal comprising the hoop 98, and for which the coefficient figure is provided, is preferably Alloy No. 27 manufactured by Carpenter Technology, Inc. of Reading, Pa. In this example, the ceramic hoop support means 100 will be noted as having a thermal coefficient of expansion very close to that of the glass of the faceplate. Alternately, the hoop support means 100 could as well have a thermal expansion coefficient intermediate to the coefficients of the glass and the metal hoop 98; e.g., a coefficient of $107\times10^{-7}$ per degree Celsius.

Having a separate ceramic hoop support means makes it possible to use a less expensive metal for the rail in place of a more costly alloy. For example, a steel less expensive than a fully compatible alloy could as well be used, as the ceramic buffer is able to compensate for a greater disparity in coefficients of thermal expansion of the metal and the glass of the faceplate. An example of such a metal is type 430 stainless steel; it has a thermal coefficient of expansion of $111\times10^{-7}$ per degree Celsius in the range 25 to 430 degrees C.

Further with regard to FIG. 10, a shadow mask 108 is shown as being secured to the separate metal hoop 98 by weldments, as indicated by the weldment symbols. The hoop 98 is noted as being of such strength as to be able by itself to resist the restorative forces of the tensed foil shadow mask. However, additional resistance to the high inward tension is provided by the ceramic hoop support means 100, which in turn takes its strength primarily from its integral securement to the glass of the faceplate.

The ceramic material may comprise, by way of example, a product known as "forsterite," designated generically as magnesium silicate. Ceramic is a refractory material that can be formed into the rails by the dry-pressing process, or preferably, by extrusion. It is essential that the precision and linearity of its dry-pressed or extruded configuration be maintained after firing, and that warping be at a minimum. Also, the composition of the the ceramic must be compatible chemically with that of the glass of the faceplate, and with the weldable metal cap or strip. Further, the ceramic must be of such composition that the internal environment of the tube will not be contaminated by the shedding of particulate matter, or by outgassing.

A suitable ceramic composition is fully described and claimed in copending application Ser. No. 006,391 of common ownership herewith. The composition of the ceramic is described hereafter in the present application as enabling information for one skilled in the art.

The elemental or oxide composition according to the referent Ser. No. 006,391 disclosure comprises the following

| INGREDIENT | WEIGHT PERCENT |
|---|---|
| Aluminum oxide | 9.49 |
| Silicon dioxide | 30.69 |
| Magnesium oxide | 43.38 |
| Potassium oxide | 2.38 |
| Calcium oxide | 1.89 |
| Zinc oxide | 12.17 |

The extrusion batch contains the ceramic composition, the organic binder/plasticizer system, and 15 to 35% water, depending on the extrusion conditions desired.

Because of an exothermic reaction from the hydrolization of the magnesium oxide, the ingredients are preblended dry and then mixed with a suitable amount of water to hydrolize the magnesium. To mill the ingredients, they are combined with sufficient water to form a slurry.

The ingredients are intimately and thoroughly mixed using ball-milling or other suitable technique to ultimately provide a very high green (pre-fired) density. The careful mixing ensures a homogeneous condition on a micro-scale. When the extrusion process is used for forming the shadow mask supports, one or more plasticizers may be added to the dry ingredients to promote a smooth extrusion with minimum pressure. For example, 3 weight percent (of the ceramic composition) of the plasticizing agent Methocel A4M can be added to the list of ingredients described in the foregoing. In addition, 1 weight-percent of glycerine and 2 weight-percent of polyvinyl alcohol are added in the water solution to promote material flow and prefired strength in the mask support structure.

Methocel A4M is a cellulose ether available from Dow Chemical Co. of Midland, Mich.; polyvinyl alcohol is available from Air Products and Chemical Co., Inc. of Calvert, Ky.; and the glycerine and other chemicals can be had from Fisher Scientific Co. of Pittsburgh, Pa. Although specific suppliers and their designations are cited, equivalent materials of equivalent quality supplied by others may as well be used.

When dry pressing is used for forming the mask support structure, only 2½ percent polyvinyl alcohol and ½ percent glycerine are required. Firing temperature is typically about 2550 degrees C. with a holding time of about two hours at temperature. To meet changing production requirements, ceramic compositions having a range of coefficients of thermal expansion from 105 to $107\times10^{-7}$ per degree C. may be compounded and kept available in the production area.

The cement described heretofore as being used for cementing the shadow mask support structures to the faceplate (e.g., beads of cement 83 in FIG. 6), and the metal strips and caps to the structures (e.g., beads of cement 90 in the same figure), preferably comprises a devitrifying glass frit such as that supplied Owens-Illinois, Toledo, Ohio, under the designation CV-685. Alternately, the cement may comprise a cold-setting cement of the type supplied by Sauereisen Cements Company of Pittsburgh, Pa. The use of a devitrifying glass frit provides for the integral bonding of the ceramic of the mask support structure to the glass of the faceplate, as both are ceramics by classification, and hence capable of the intimate bonding defined as "welding"; that is, by intimately consolidating the components of the two ceramics. By its integral attachment to the glass, the ceramic mask-supporting structure derives support from the glass, making the structure capable of withstanding the restorative forces inherent in the high tension of the foil shadow mask. The means of securement of the shadow mask metal to the metal can be by electrical spot welding, or preferably, laser welding.

With respect to dimensions (cited by way of example), the width of the weldable metal that receives and secures the shadow mask (e.g., cap 80 in FIG. 6) may be a width in the range of 0.050 inch to a width substantially greater than the width of the support structure; the metal crown 94 depicted in FIG. 7 is an embodiment of such a width dimension. The thickness of the metal must be adequate for welding without loss of welding integrity; e.g., about 0.05 inch. The dimensions of the ceramic rails for use in a tube of 20-inch diagonal measure may 0.350 inch high and 0.250 inch wide, also by way of example. The cross-sectional configuration may be square, or there may be a slight inward taper near the mask-mounting surface. Opposed pairs of the four rails may have a length of about 12 inches and 15.9 inches, respectively. The Q-distance is about 0.399 inch in the 20-inch diagonal tube; this height includes the thickness of the metal cap.

Typical dimensions in inches of the shadow mask support structures for a 14-inch diagonal measure tube are: Q-height 0.275 and width 0.225. The opposed pairs of the four rails have a length in inches of about 8.2 and 10.9.

The preferred method of installing the mask is to stretch a pre-apertured shadow mask blank across the tensioned mask support structure by tensioning means. Suitable mask installation and tensioning means are fully described and claimed in referent copending application Ser. No. 831,696 of common ownership herewith. The mask is stretched across the supporting structure and is secured to the structure by electrical or laser welding. The weldments are preferably spaced about 0.040 inch around the circumference of the mask to ensure positive securement, so a mask for a 14-inch diagonal measure tube would have as many as 1,000 such weldments. Also, it is considered necessary that the weldable metal cap or strip have a flat surface to ensure positive, all-around intimate contact between the mask and the cap or strip. The flat surface may be created by means of a surface grinder, or by lapping; that is, by rubbing the surface of the supporting structure (when mounted on the faceplate) against a flat surface having an abrasive thereon.

A preferred embodiment of the invention described and claimed in the parent application Ser. No. 866,030 has been shown and described. It will be readily apparent to those skilled in the art that changes and modifications may be made in the inventive means described without departing from the invention in its broader aspects. An example is the embodiment of the invention described in the following, and depicted in FIGS. 11A, 11B and 12. The embodiments depicted can comprise a component of the color cathode ray tube 20 shown by FIG. 1, wherein there is depicted a front assembly 22 including a faceplate 24 having on its inner surface 26 a centrally disposed phosphor screen 28 made electrically conductive by a film 30 of aluminum. A peripheral sealing area 34 on the inner surface 26 of faceplate 24 provides for receiving a funnel 32 having an internal electrical conductive coating 60 adapted to receive a high electrical potential, as indicated in FIG. 1. The front assembly 22 is depicted as having a separate shadow mask support structure 48, indicated schematically as being composed of ceramic material, secured to the faceplate inner surface 26 between screen 28 and peripheral sealing area 34.

Figure 11B:
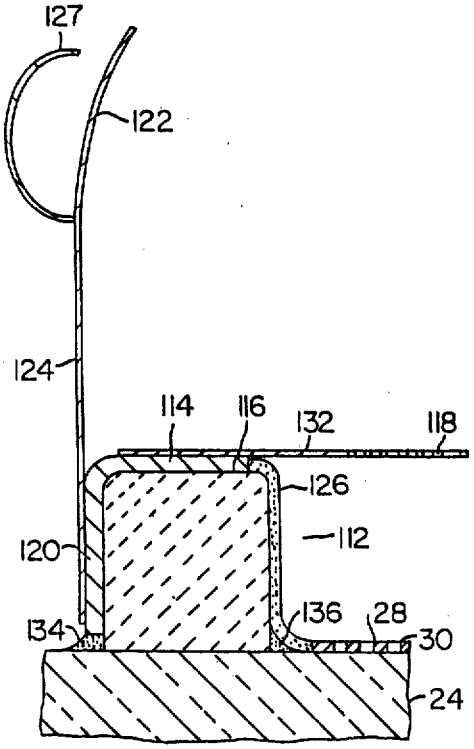
FIG. 11B is a view in section and in elevation of the part of the assembly depicted in FIG. 11.
Figure 11A:
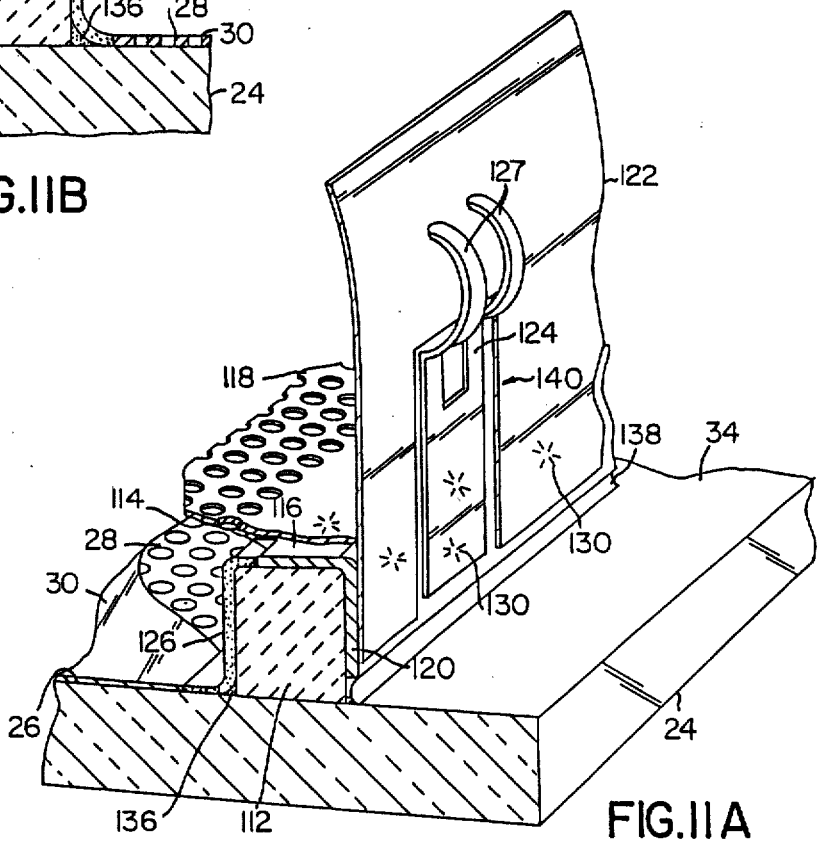
FIG. 11A is a perspective view in elevation of a part of a color cathode ray tube front assembly that depicts the embodiment of a shadow mask support structure according to the present invention in relation to other front assembly components.

The embodiment of a support structure 112 depicted in FIGS. 11A and 11B will be noted as having a separate cap 114, indicated symbolically as being a metal. Cap 114 is indicated as having a flat surface 116 with a tensed foil shadow mask 118 secured thereto. An apron 120 is shown as depending from the cap 114 essentially perpendicular to screen 28 and adjacent to the sealing area 34. Apron 120 according to the invention is shown as having secured thereto an internal magnetic shield 122. Apron 120 also has secured thereto according to the invention an electrical conductor 124 for conducting high voltage from the internal conductive coating 60 on the funnel 32 (shown by FIG. 1) to the metal cap 114. As a result, a high voltage connection is provided between the internal funnel coating 60, the screen 28, and the shadow mask 118. The electrical conductor 124 is shown as having the form of a contact spring with two flexible tines 126 for contacting the high-voltage-charged internal conductive coating 60 on the funnel 32, and conducting the voltage to the cap 114, the shadow mask 118, and the screen 28.

The high voltage connection from the metal of the cap 114 to the screen 28 is indicated as being by way of a coating of electrically conductive dag 127 which is depicted as being in contact with the film of aluminum 30, noted as also being electrically conductive.

The means for securing the shadow mask 118 to the cap 114, and the internal magnetic shield 122 and electrical connector, to the apron 120, is indicated as comprising weldments 130, depicted schematically by the welding symbols. As with previous configurations, the means of welding may be by electrical resistance welding or laser welding.

Cap 114 with its depending apron 120 is indicated as being fastened to the ceramic of the support structure 112 by beads of cement 132 and 134, which may comprise the devitrifying glass frit described heretofore. The support structure 112 also indicated as being attached to the glass of the faceplate 24 by beads of frit 136 and 138 which may also comprise a devitrifying glass frit. As noted, the frit is also applied between the attached parts.

The internal magnetic shield 122 will be noted as having according to the invention an opening 140 providing for mounting the electrical conductor 124 on the apron 120 of support structure 112.

Figure 12:
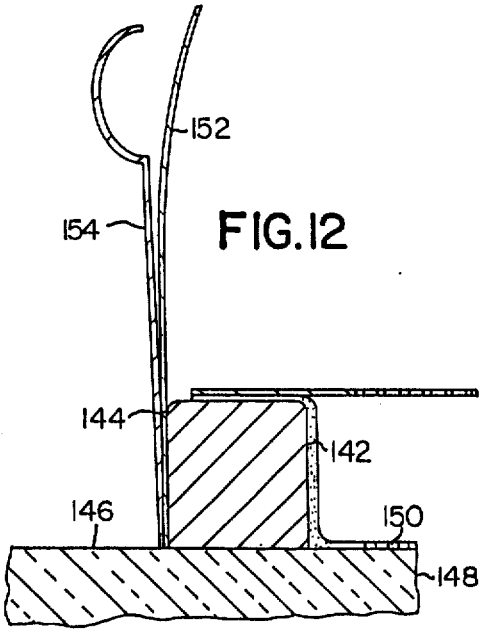
FIG. 12 is a view similar to FIG. 11B showing another aspect of the preferred embodiment of the invention.

In FIG. 12 there is depicted an embodiment of the invention wherein a shadow mask support structure 142, indicated symbolically as being a metal, is shown as having a side 144 adjacent to the sealing area 146 of a faceplate 148, and essentially perpendicular to the screen 150, with an internal magnetic shield 152 secured thereto. Electrical conductor 154 is depicted as being mounted directly on the internal magnetic shield 152, rather than through an opening 140 in the shield. Securement is preferably by weldments as indicated by the weld symbol.

The aim of the appended claims is to cover all such changes and modifications as fall within the true spirit and scope of the invention.

What is claimed is:

1. A front assembly for a color cathode ray tube having improved means for mounting components for electrical inter-connection and magnetic shielding, the assembly comprising:

a faceplate having on its inner surface a centrally disposed, electrically conductive phosphor screen;

a peripheral sealing area on said inner surface of said faceplate for receiving a funnel, said funnel having an internal electrically conductive funnel coating adapted to receive a high electrical potential;

a shadow mask support structure secured to said inner surface of said faceplate between said screen and said peripheral sealing area and enclosing said screen and in contact with said screen, said structure supporting in electrical union therewith a tensed foil shadow mask, said structure having an electrically conductive surface adjacent to said sealing area essentially perpendicular to said screen and having secured thereto by weldments an internal magnetic shield, said assembly including an electrical conductor secured to said electrically conductive surface of said shadow mask support structure and extending through an opening in said shield and in contact with said internal conductive coating of said funnel, whereby an electrical connection is formed between said funnel coating and said mask, through said electrical conductor and said electrically conductive surface of shadow mask support structure.

2. A front assembly for a color cathode ray tube having improved means for mounting a component for magnetic shielding, the assembly comprising:

a faceplate having on its inner surface a centrally disposed phosphor screen;

a peripheral sealing area on said inner surface of said faceplate for receiving a funnel;

a ceramic shadow mask support structure secured to said inner surface of said faceplate between said screen and said peripheral sealing area and enclosing said screen, said structure having separate metallic cap with a tensed foil shadow mask secured thereto by weldments, said metallic cap having a depending apron adjacent to said sealing area essentially perpendicular to said screen with an internal magnetic shield secured thereto.

3. A front assembly for a color cathode ray tube having improved means for mounting components for electrical inter-connection and magnetic shielding, the assembly comprising:

a faceplate having on its inner surface a centrally disposed, electrically conductive phosphor screen;

a peripheral sealing area on said inner surface of said faceplate for receiving a funnel, said funnel having an internal electrically conductive funnel coating adapted to receive a high electrical potential;

an electrically non-conductive shadow mask support structure secured to said inner surface of said faceplate between said screen and said peripheral sealing area and enclosing said screen, said structure having separate metallic cap with a tensed foil shadow mask secured thereto by weldments, said metallic cap having a depending apron adjacent to said sealing area essentially perpendicular to said screen with an internal magnetic shield secured thereto.

4. The front assembly according to claim 3 wherein said non-conductive support structure comprises a ceramic material.

5. The front assembly according to claim 3 wherein said depending apron has secured thereto, in addition to said magnetic shield, an electrical conductor for conducting high voltage from said internal conductive coating of said funnel to said support structure and said mask, and to said screen.

6. The front assembly according to claim 4 wherein said internal magnetic shield includes an opening for providing access for securement of said electrical conductor directly to said depending apron.

7. A front assembly for a color cathode ray tube having improved means for mounting components for electrical inter-connection and magnetic shielding, the assembly comprising:

a faceplate having on its inner surface a centrally disposed, electrically conductive phosphor screen;

a peripheral sealing area on said inner surface of said faceplate for receiving a funnel, said funnel having an internal electrically conductive funnel coating adapted to receive a high electrical potential;

a ceramic shadow mask support structure secured to said inner surface of said faceplate between said screen and said peripheral sealing area and enclosing said screen, said structure having a separate metallic cap having a flat surface with a tensed foil shadow mask secured thereto by weldments and in contact with said screen by means of an electrical dag on the surface of said support structure, said cap having a depending apron adjacent to said sealing area essentially perpendicular to said screen and having secured thereto by weldments an internal magnetic shield and an electrical conductor extending through an opening in said shield and in contact with said internal conductive coating, whereby a high-voltage connection is provided between said internal funnel coating, said screen, and said mask, through said electrical conductor, said electrical dag, said metallic cap and said depending apron.

8. A front assembly for a color cathode ray tube having improved means for mounting an internal magnetic shield, comprising:

a faceplate having on its inner surface of centrally disposed, electrically conductive phosphor screen;

a peripheral sealing area on said inner surface of said faceplate for receiving a funnel having an internal electrically conductive coating adapted to receive a high electrical potential;

a shadow mask support structure supporting a foil mask in tension, said structure being secured to said inner surface of said faceplate between said screen and said peripheral sealing area and enclosing said screen, said structure having an electrically conductive side adjacent to said sealing area;

an internal magnetic shield secured to said electrically conductive side of said support structure;

an electrical conductor secured to said electrically conductive side of said support structure and extending through an opening in said magnetic shield for conducting voltage from said internal conductive coating of said funnel to said electrically conductive side of support structure.

* * * * *